(12) United States Patent
Krätschmer et al.

(10) Patent No.: US 8,312,720 B2
(45) Date of Patent: Nov. 20, 2012

(54) METHOD FOR CONTROLLING AN ENGINE BRAKING DEVICE OF AN INTERNAL COMBUSTION ENGINE AND INTERNAL COMBUSTION ENGINE FOR A MOTOR VEHICLE

(75) Inventors: Stephan Krätschmer, Schwäbisch Gmünd (DE); Wolfram Schmid, Nürtingen (DE); Wolfgang Sladek, Ostfildern (DE); Siegfried Sumser, Stuttgart (DE)

(73) Assignee: Daimler A G, Stuttgart (DE)

( * ) Notice: Subject to any disclaimer, the term of this patent is extended or adjusted under 35 U.S.C. 154(b) by 390 days.

(21) Appl. No.: 12/802,736

(22) Filed: Jun. 11, 2010

(65) Prior Publication Data

US 2010/0300090 A1  Dec. 2, 2010

Related U.S. Application Data

(63) Continuation-in-part of application No. PCT/EP2008/009108, filed on Oct. 29, 2008.

(30) Foreign Application Priority Data

Dec. 14, 2007 (DE) .......................... 10 2007 060 415

(51) Int. Cl.
*F02B 33/44* (2006.01)

(52) U.S. Cl. .............. 60/605.2; 60/600; 60/602; 60/624

(58) Field of Classification Search ................ 60/600, 60/602, 605.2, 299, 624
See application file for complete search history.

(56) References Cited

U.S. PATENT DOCUMENTS 7,089,738 B1 * 8/2006 Boewe et al. ................ 60/605.2

FOREIGN PATENT DOCUMENTS

| DE | 101 52 803 | 5/2003 |
| DE | 101 52 804 | 5/2003 |
| DE | 102 28 003 | 1/2004 |
| DE | 10 2004 027 582 | 12/2005 |
| DE | 10 2004 034 070 | 2/2006 |

* cited by examiner

*Primary Examiner* — Ching Chang
(74) *Attorney, Agent, or Firm* — Klaus J. Bach

(57) ABSTRACT

In an internal combustion engine comprising an exhaust gas turbocharger, which includes a compressor with a compressor wheel arranged in an inlet tract of the internal combustion engine and a turbine with a turbine wheel coupled rotationally to the compressor wheel and arranged in an at least two-path exhaust gas tract of which is connected to an exhaust gas guide section of the turbine including at least a first spiral channel coupled to the first exhaust path and a second spiral channel coupled to a second exhaust gas path, two guide vane elements are arranged upstream of the turbine wheel and downstream of respective spiral channels which are formed corresponding to a first degree of asymmetry $A_1$ determined as a quotient $\Theta$ of a first mass flow parameter and a second mass flow parameter which is between 0.4 and 0.8.

18 Claims, 4 Drawing Sheets

METHOD FOR CONTROLLING AN ENGINE BRAKING DEVICE OF AN INTERNAL COMBUSTION ENGINE AND INTERNAL COMBUSTION ENGINE FOR A MOTOR VEHICLE

This is a Continuation in Part application of pending international patent application PCT/EP2008/009108 filed Oct. 29, 2008 and claiming the priority of German patent application 10 2007 060 415.9 filed Dec. 14, 2007.

BACKGROUND OF THE INVENTION

The invention relates to an internal combustion engine for a motor vehicle including an exhaust gas turbocharger with two exhaust gas lines leading from the engine and a flow control device for interconnecting the exhaust gas lines and/or for bypassing the turbine and to a method for controlling such an internal combustion engine.

Due to the continuous tightening of engine emission limit values, for example the $NO_x$ and soot emission values of diesel engines, the requirements of internal combustion engines with exhaust gas turbocharger are also tightened. Thus, increasing requirements with regard to the charge pressure provision for example with regard to the charge pressure provision over average or high load operating ranges of the internal combustion engine are becoming tighter, whereby exhaust gas turbochargers have to be scaled down geometrically. In other words, the required high turbine performances of exhaust gas turbochargers are realized by an increase of the build-up capacity or the reduction of the operating flow capacity of the exhaust gas turbochargers in cooperation with the respective internal combustion engine. A further negative influence with regard to the performance of exhaust gas turbochargers results from exhaust gas treatment systems arranged in the exhaust gas tract downstream of the exhaust gas turbine of the exhaust gas turbocharger, for example soot filters, catalytic convertors or SCR plants. These exhaust gas treatment systems lead to a pressure increase at an outlet of the exhaust gas turbocharger which reduces the pressure drop across the turbine describing the performance of the exhaust gas turbocharger. The turbine pressure drop can be determined as the quotient of a pressure in front of the turbine wheel or before the entrance to an exhaust gas guide section and a pressure behind, or at the exit of, the exhaust gas guide section. The turbine size has again to be designed for smaller values hereby, in order to be able to satisfy the performance requirement of the compressor side. As a result, a sufficient exhaust gas amount is not available even with an exhaust gas turbocharger, whose exhaust gas guide section has two spiral channels through which exhaust gases flow independently, for achieving the required charge air pressure on the compressor side. Due to the reduced geometrical dimensions of the spiral channels, comparatively high flow losses are generated because of wall frictions, which leads to a further decrease of the degree of efficiency. The same is true for exhaust gas turbochargers, which have guide vane elements in the exhaust gas guide passages upstream of the turbine wheel and downstream of the spiral channels. These guide vane elements thereby permit a pressure increase in front of the turbine wheel of the exhaust gas turbocharger, so that an improved degree of efficiency of the exhaust gas turbocharger can be achieved even with a low mass flow of exhaust gas in the first spiral channel.

Even though exhaust gas turbochargers having an exhaust gas guide section with two spiral channels and corresponding guide vane elements are comparatively cost-efficient in their production, elaborate and cost-intensive measures are necessary to make an improvement of their degree of efficiency and corresponding reductions in fuel consumption of the internal combustion engine possible. A further problem with regard an exhaust gas recirculation capability of these exhaust gas turbochargers arises in connection with the required combustion air supply in particular in the lower or medium speed range of the internal combustion engine. With the usual design constraints, which are provided at the nominal operating point of the internal combustion engine based on gas change considerations and fuel consumption considerations, only a limited operating range can be handled in an optimum manner, even with a double path exhaust gas inlet guide arrangement.

It is the object of the present invention to provide an internal combustion engine with an exhaust gas turbocharger and a method of controlling such an internal combustion engine, such that an improvement of the degree of efficiency in a relatively large operating range of the exhaust gas turbocharger is obtained.

SUMMARY OF THE INVENTION

In an internal combustion engine comprising an exhaust gas turbocharger, which includes a compressor with a compressor wheel arranged in an inlet tract of the internal combustion engine and a turbine with a turbine wheel coupled rotationally to the compressor wheel and arranged in an at least two-path exhaust gas tract of which is connected to an exhaust gas guide section of the turbine including at least a first spiral channel coupled to the first exhaust path and a second spiral channel coupled to a second exhaust gas path, two guide vane elements are arranged upstream of the turbine wheel and downstream of respective spiral channels which are formed corresponding to a first degree of asymmetry $A_1$ determined as a quotient $\Theta$ of a first mass flow parameter and a second mass flow parameter which is between 0.4 and 0.8.

In this way, the compressor can provide the required air volume for a predetermined fuel air ratio with engine speeds in the lower and in the upper speed ranges. In other words, the guide vane elements are formed or are adjusted in such a manner that a first degree of asymmetry between 0.4 and 0.8 results. The degree of asymmetry A can be determined by the critical mass flow parameters $\Theta_{L1}$, $\Theta_{L2}$ of the first and the second guide vane element according to the general formula $$A = \Theta_{L1}/\Theta_{L2}.$$

The critical mass flow parameter $\Theta$, which represents a constant value for the respective system exhaust gas turbocharger and internal combustion engine, can be determined by the function:

$$\Theta = \frac{M_{T,NP} * \sqrt{T_{3,NP}}}{p_{3,NP}}$$

wherein $m_{T,NP}$ is the exhaust gas mass flow [kg/s] through the exhaust gas guide section at a nominal performance point of the internal combustion engine;

$T_{3,NP}$ is a total temperature [° K.] of the exhaust gas mass flow in front of the turbine wheel at the nominal performance point of the internal combustion engine; and $p_{3,NP}$ is a total pressure [bar] in front of the turbine wheel at the nominal performance point of the internal combustion engine.

A further improvement of the degree of efficiency of the exhaust gas turbocharger is achieved in a further arrangement wherein the first and the second guide vane element is formed with a second degree of asymmetry, which can be determined as the quotient of the first critical mass flow parameter and a third critical mass flow parameter and has values between 0.25 and 0.5. Such a second degree of asymmetry permits an advantageous flow area adaptation or area enlargement between the two spiral channels in particular with higher engine speeds.

In a further advantageous embodiment of the invention it is provided that the first guide vane element and/or the second guide vane element is arranged in particular in a translationally or rotationally movable manner in the exhaust gas guide section for adjusting the inlet flow cross-section. With the help of the movability of the first and/or second guide vane element, an especially simple and variable adaptability of the effective flow cross section of the first or second spiral channel and of the first or the second degree of asymmetry is possible. It can thereby be provided that the first or second guide vane element is moved into the respective spiral channel during a braking phase of the internal combustion engine, so that the exhaust gas turbocharger can function as a so-called "turbo brake". Alternatively or additionally, it can however also be provided that the first and/or second guide vane element are moved into or out of the spiral inlet channel during a firing phase of the internal combustion engine, whereby an optimum adaptability of the power output of the exhaust gas turbocharger to the respective prevailing operating parameters of the internal combustion engine and a simple adjustability of the first or second degree of asymmetry is facilitated.

Further advantages result in that the first guide baffle element and/or the second guide baffle element is, or are, coupled to an engine control device of the internal combustion engine and can be adjusted in dependence on control signals. In this manner, the movement of the first and/or of the second guide vane element can be carried out in dependence on the respective operating state of the internal combustion engine in an optimal manner.

In a further advantageous embodiment of the invention it is provided that the blow-down or flow control device is designed to direct the exhaust gas from the first exhaust gas path to the second exhaust gas path or vice versa. In other words, it is thus provided that not only the exhaust gas vane section can be bypassed by means of the flow control device, but that alternatively or additionally exhaust gas can also be exchanged between the first and the second exhaust gas paths. This permits a fine-trimming of the exhaust gas mass flow through the exhaust gas flow guide section of the exhaust gas turbocharger. Furthermore, the first or the second degree of asymmetry can also be formed or adjusted between the first and the second spiral channel in this manner. The blow-down device can be, for example, in the form of a rotary valve which is a simple component resulting in corresponding cost reductions.

It has thereby furthermore been shown to be advantageous that the flow control device is coupled to the engine control unit of the internal combustion engine for receiving control signals and is controlled in dependence of the control signals. This also permits a further optimization of the exhaust gas flow and thus of the degree of efficiency of the exhaust gas turbocharger, as the function of the blow-down or redirecting the exhaust gas can be controlled specifically in dependence on different operating parameters of the internal combustion engine.

A further improvement of the emission values of the internal combustion engine is obtained in that an exhaust gas treatment system, in particular a soot filter and/or a catalytic converter and/or a SCR unit is arranged in the exhaust gas tract in particular downstream of the flow control device. A possible increase of a back pressure at the turbine can be compensated for with the help of the variable first or second degree of asymmetry in an advantageous manner.

A further improvement of the emissions of the internal combustion engine is made possible in that an exhaust gas recirculation system is arranged upstream of the flow control device, by means of which exhaust gas can be directed from the exhaust gas tract into the inlet tract of the internal combustion engine. The exhaust gas recirculation system can thereby be formed as an internal and also an external exhaust gas recirculation system and provides in particular for a reduction of the nitrogen oxides ($NO_X$) generation during the combustion of fuel in the internal combustion engine. Due to the greater variability of the internal combustion engine, the ratio of the exhaust gas recirculation rates to the respective required air fuel ratio numbers can be adjusted in a relatively large engine operating range in an optimal manner.

It can herein be provided that the exhaust gas recirculation system is coupled to the first exhaust gas path and/or to the second exhaust gas path, whereby the internal combustion engine can be formed in dependence on different design limitations. It can thereby also be provided that the exhaust gas recirculation system is coupled to the engine control device and controlled in dependence on corresponding control signals.

A further improvement of the degree of efficiency of the internal combustion engine is obtained in that a charge-air cooler is arranged in the inlet tract downstream of the compressor wheel of the exhaust gas turbocharger.

The flexibility of the exhaust gas turbocharger is increased in that the first spiral channel and the second spiral channel are formed in an asymmetric manner. In combination with the exhaust gas return system a further increase of the degree of efficiency of the exhaust gas turbocharger or of the internal combustion engine in a larger operating range is obtained thereby.

A further improvement of the operating range is obtained in that the second spiral channel is configured for a nominal operating point of the internal combustion engine, so that an operation of the turbine wheel under full load—for example in an upper speed region of the internal combustion engine—is made possible.

A further aspect of the invention relates to a method for controlling an internal combustion engine, in particular an Otto and/or Diesel engine, for a motor vehicle, with:
  an exhaust gas turbocharger, which comprises a compressor wheel arranged in an inlet tract of the internal combustion engine and a turbine wheel coupled to the compressor wheel and arranged in an exhaust gas tract of the internal combustion engine the exhaust tract having at least a double path, wherein an exhaust gas guide vane structures are arranged in the housing of the exhaust gas turbocharger which has at least a first spiral channel coupled to a first exhaust gas path and a second spiral channel coupled to a second exhaust gas path, through which the exhaust gas flow is conducted in an independent manner;
  a blow-down or flow control device arranged upstream of the exhaust gas guide section, by means of which the exhaust gas guide section can be bypassed;

a first guide vane element, which is arranged upstream of the turbine wheel and downstream of the first spiral channel in the exhaust gas turbine inlet passages; and a second guide baffle element, which is arranged upstream of the turbine wheel and downstream of the second spiral channel in the exhaust gas turbine inlet passage;

in which the first and the second guide vane element are formed corresponding to a first degree of asymmetry as a quotient of a first critical flow-though parameter and a second critical flow-through parameter and has values between 0.4 and 0.8. This provides for an improvement of the efficiency in a larger operating range of the exhaust gas turbocharger, as, due to the adjustability of the guide vane elements according to the invention, an improved conditioning of the exhaust gas flow from the second spiral channel to the turbine wheel is obtained. Additionally, a particularly flexible adaptability of the effective flow cross-section of the spiral channels is provided, whereby an optimum adaptability of the output of the exhaust gas turbocharger to the respectively prevailing operating parameters of the internal combustion engine is made possible. The respective optimum degree of asymmetry can be determined by the expert for example in dependence on exhaust gas recirculation rates and a piston displacement volume of the internal combustion engine.

It can thereby be provided that the first and the second guide vane elements are formed corresponding to a second degree of asymmetry, which is determined as a quotient of the first critical flow volume parameter and a third critical flow volume parameter and has values between 0.25 and 0.5. Such a second degree of asymmetry permits an advantageous flow area adaptation or area enlargement between the two spiral channels in particular in the upper engine speed range.

In a further advantageous embodiment of the invention it is provided that in a lower and/or medium speed range of the internal combustion engine the second guide vane element is moved during a partial load and/or full load requirement and/or in an engine braking phase of the internal combustion engine into a position in which the flow area of the second spiral channel is closed at least to a large extent. A movement of the second guide vane element during a partial load and/or full load demand in a lower or middle speed range of the internal combustion engine into the position in which the flow cross-section of the second spiral channel is largely closed has the advantage that the fuel air ratio at the air intake side is influenced in a significant manner to provide for an advantageous combustion. The build-up pressure resulting therefrom can additionally be used for the performance increase of the exhaust gas turbocharger via a swirl increase of the exhaust gas flow in addition to an increase of the inflow speed to the turbine wheel and a corresponding increase of the performance of the turbocharger, so that the compressor can provide an increased amount of combustion air. Conversely, a movement of the second guide vane element during an engine braking phase of the internal combustion engine into a position in which the flow cross-section of the second spiral channel is closed at least to a large extent provides for a considerable increase of the brake performance due to the increased counter pressure.

Further advantages are achieved by a movement of the second guide vane element in an upper speed range into a position in which the flow area of the second spiral channel is essentially open. In this position, the entry swirl of the exhaust gas flow is reduced and is essentially determined by the geometry of the exhaust gas guide section or respectively of the second spiral channel, which is advantageously configured for the nominal operating point of the internal combustion engine.

Still further advantages are obtained in that depending on the operating state of the internal combustion engine, at least a part of the exhaust gas is blown-down or conducted from the first exhaust gas path and/or from the second exhaust gas path by means of the blowing device to the second or respectively the first exhaust gas path. In this manner, an overstraining of the internal combustion engine or of the exhaust gas turbocharger can be avoided during the engine braking phase and during a firing phase. A fine-trimming of the first or second degree of asymmetry is also possible.

The invention will become more readily apparent from of the following description of a particular embodiment thereof with reference to the accompanying drawings, in which the same elements or elements which are functionally the same are provided with identical reference numerals.

DESCRIPTION OF A PARTICULAR EMBODIMENT

Figure 1:
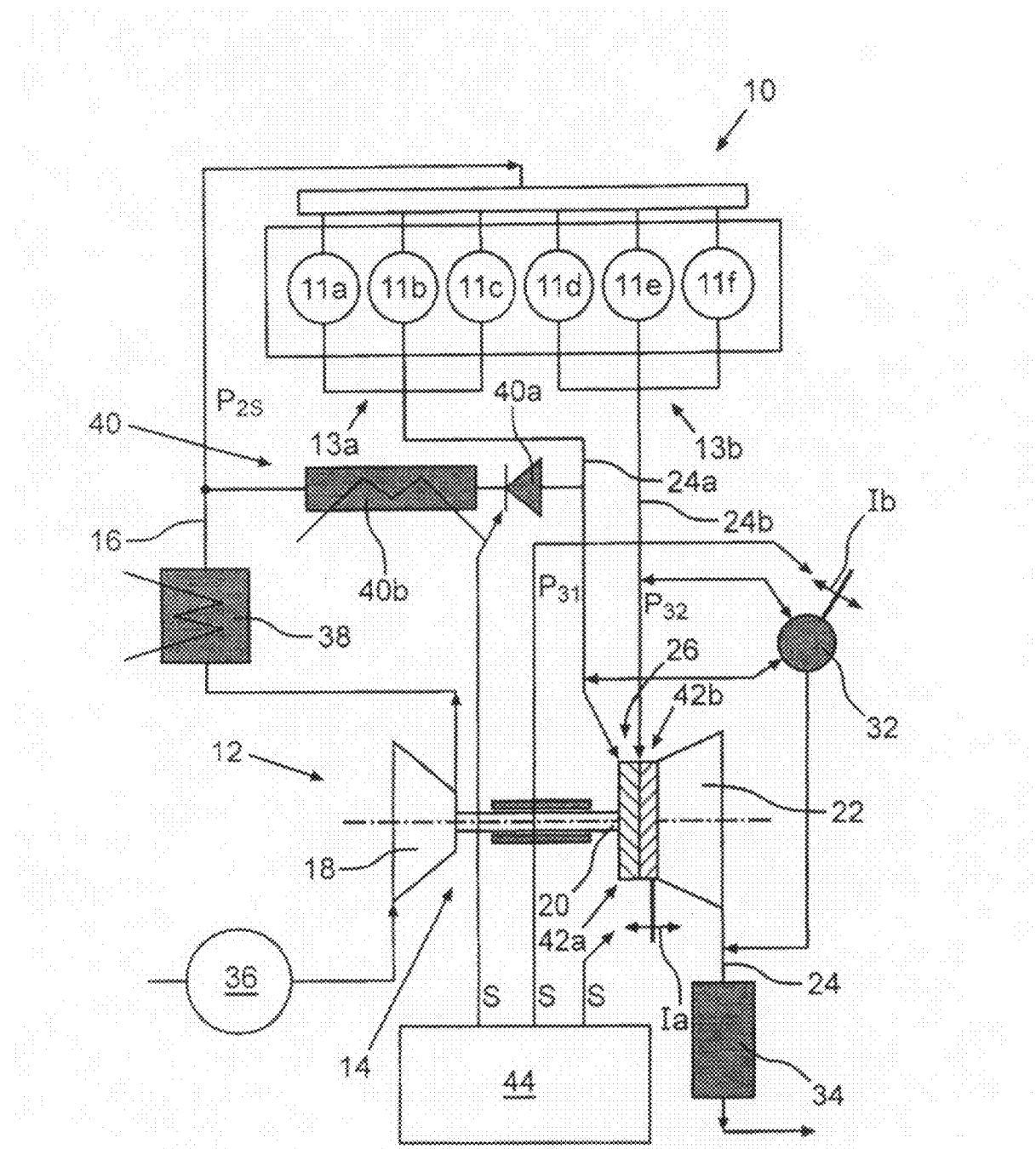
FIG. 1 shows schematically an internal combustion engine with an exhaust gas turbocharger according to one embodiment of the invention.

FIG. 1 shows a diagram of an internal combustion engine 10, which may be a Diesel or Otto engine with six cylinders 11a-11f. The internal combustion engine 10 includes an exhaust gas turbocharger 12, which comprises as a moving part 14 a compressor wheel 18 arranged in an inlet tract 16 of the internal combustion engine 10 and a turbine wheel 22 coupled to the compressor wheel 18 in a rotationally fixed manner via a mounted shaft 20 and disposed in an exhaust gas tract 24 of the internal combustion engine 10. The exhaust gas tract 24 includes at least two paths. An exhaust gas guide section 26 of a housing 28 (see FIG. 2, FIG. 3) of the exhaust gas turbocharger 12 has at least a first spiral channel 30a coupled to a first exhaust gas path 24a of the exhaust gas tract 24 and a second spiral channel 30b coupled to a second exhaust gas path 24b of the exhaust gas tract 24, through which exhaust gas flows are conducted independently of each other. The first exhaust gas path 24a is thereby coupled to a first exhaust gas manifold 13a, the second exhaust gas path 24b is coupled to a second exhaust gas manifold 13b. A first flow control device 32 is arranged upstream of the exhaust gas guide section 26, which flow control device is coupled to the first and the second exhaust gas path 24a, 24b, and connected to the exhaust gas tract 24 downstream of the turbine wheel 22 and upstream of an exhaust gas treatment system 34. The flow control device 32 is for example in the form of a rotary disk designed to direct the exhaust gas to bypass the exhaust gas guide section 26 or to conduct the exhaust gas to and from either one of the first and the second exhaust gas path 24a, 24b. The flow control device 32 can be moved herefor as indicated by the arrow 1b. The exact operating mode will be explained in detail in further below. The inlet tract 16 comprises an air filter 36 and a charge-air cooler 38 arranged downstream of the compressor 18. An exhaust gas recirculation system 40 is connected to the inlet tract 16 downstream of the charge-air cooler by way of which exhaust gas can be conducted from the first exhaust gas path 24a to the inlet tract 16. The exhaust gas recirculation system 40 comprises a controllable exhaust gas recirculation valve 40a and an exhaust gas cooler 40b, by which the exhaust gas can be cooled to about 100° C. The second exhaust gas path 24b on the other hand is not coupled to the exhaust gas recirculation system 40.

In the exhaust gas guide section 26 of the exhaust gas turbocharger 12, a first guide vane element 42a is arranged upstream of the turbine wheel 22 and downstream of the first spiral channel 30a. Furthermore, a second guide vane element 42b is arranged upstream of the turbine wheel 22 and downstream of the second spiral channel 30b. Both guide vane elements 42a, 42b can for example be formed as guide vane rings provided with guide blades. The first and the second guide vane elements 42a, 42b are formed with a first degree of asymmetry $A_1$, which is determined as a quotient of a first critical mass flow parameter $\Theta_{42a}$ and a second critical mass flow parameter $\Theta_{42b}$ of the two guide vane elements 42, 42b according to the formula $$A_1 = \Theta_{42a} / \Theta_{42b}$$

and has values between 0.4 and 0.8. Herein, the first guide vane element is arranged in an unmovable manner with leakages as small as possible with regard to the cross section of the first spiral channel 30a, whereas the second guide vane element 42b is arranged axially movably in the exhaust gas guide section 26 according to arrow 1a for adjusting a flow area 48 (see FIG. 2) and thus the first degree of asymmetry $A_1$. Alternatively or additionally, it can be provided that the first guide vane element 42a is also arranged in a movable manner. The second guide vane element 42b is coupled to an engine control device 44 of the internal combustion engine 10 and can be moved in dependence on control signals S. The engine control device 44 regulates and controls, in addition to numerous further functions—as for example the fuel supply of the internal combustion engine 10—also the exhaust gas recirculation valve 40a and the flow control device 32. The first guide vane element 42a causes a pressure build-up $p_{31}$, whereby exhaust gas can be transported via the first exhaust gas path 24a and the exhaust gas recirculation system 40 to the inlet tract 16, which has the lower charge pressure $p_{2S}$.

Figure 2:
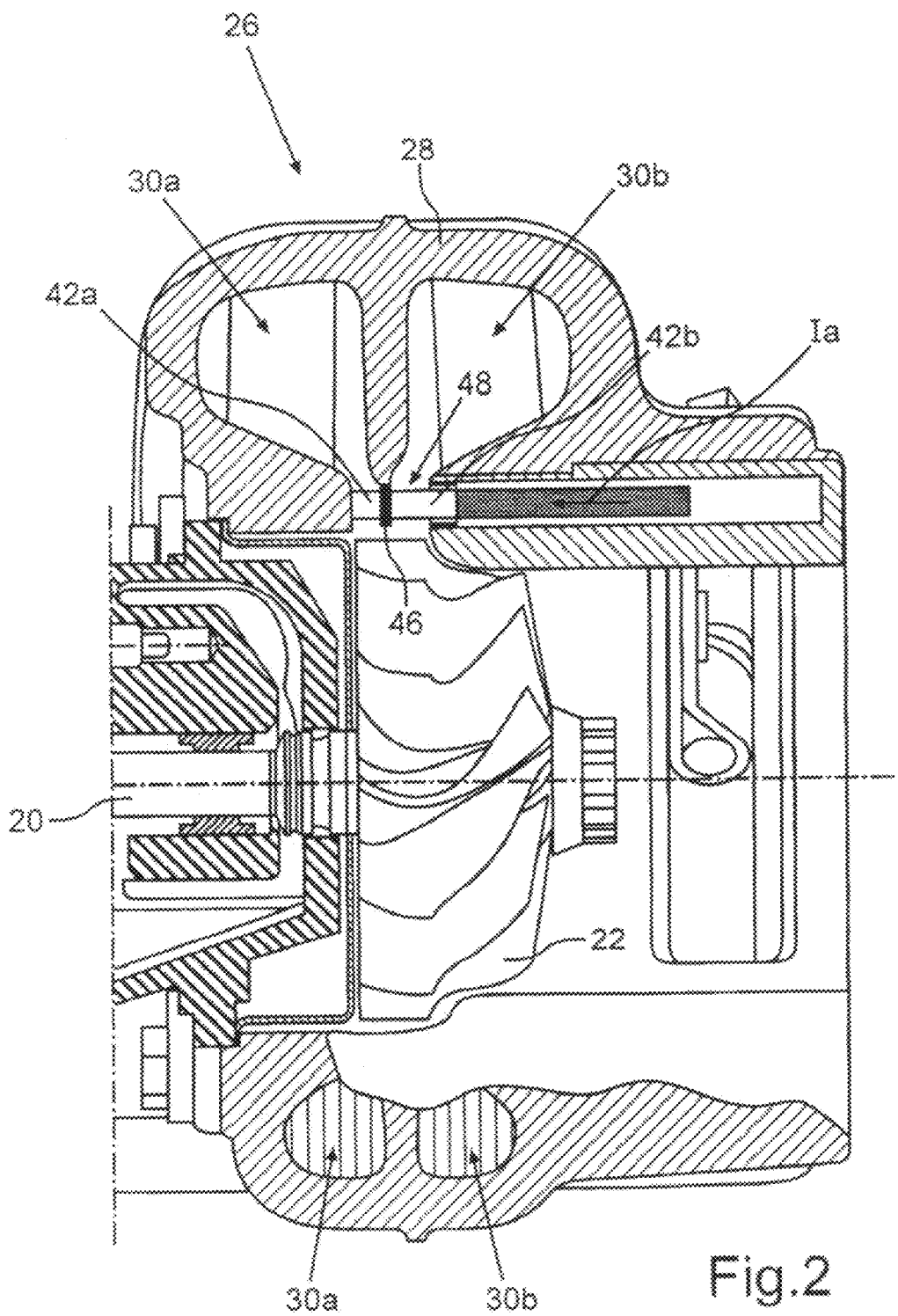
FIG. 2 shows, partially in section, an exhaust gas guide section of the exhaust gas turbocharger shown in FIG. 1, wherein a guide vane element is moved into a position for closing the flow area of a second spiral channel.

FIG. 2 shows, schematically and partially in section, the exhaust gas guide section 26 of the exhaust gas turbocharger 12 shown in FIG. 1, wherein the second guide vane element 42b is moved into a position closing the flow area 48 of the second spiral channel 30b at least to a large extent. A face of the second guide vane element 42b is thereby pressed onto a separation disk 46 by means of an actuator, not shown, in order to avoid leakages at the face side. The shown position of the second guide vane element 42b is thereby advantageously chosen during a firing phase in a lower or medium speed range of the internal combustion engine 10 with a partial load or full load requirement or during an engine braking phase of the internal combustion engine 10. The firing phase is hereby characterized by high exhaust gas recirculation rates and a sufficient air flow, whereby, for example with internal combustion engines 10 in the form of Diesel engines, extremely low particle emission values far below the limit value are obtained. In this case, the fuel injection points—possibly in dependence on increasing exhaust gas recirculation rates—can be advanced, in order to ensure an operating state of the internal combustion engine 10 which is as consumption-efficient as possible. The build-up pressure $P_{32}$ (see FIG. 1) caused by the closing of the flow area 48 to at least a large extent can be used for a performance increase of the exhaust gas turbocharger 12 via a swirl increase of the exhaust gas flow which is associated therewith and with which the compressor 18 can provide an increased supply of air. By the insertion of the second guide vane element 42b the first degree of asymmetry $A_1$ is established.

Figure 3:
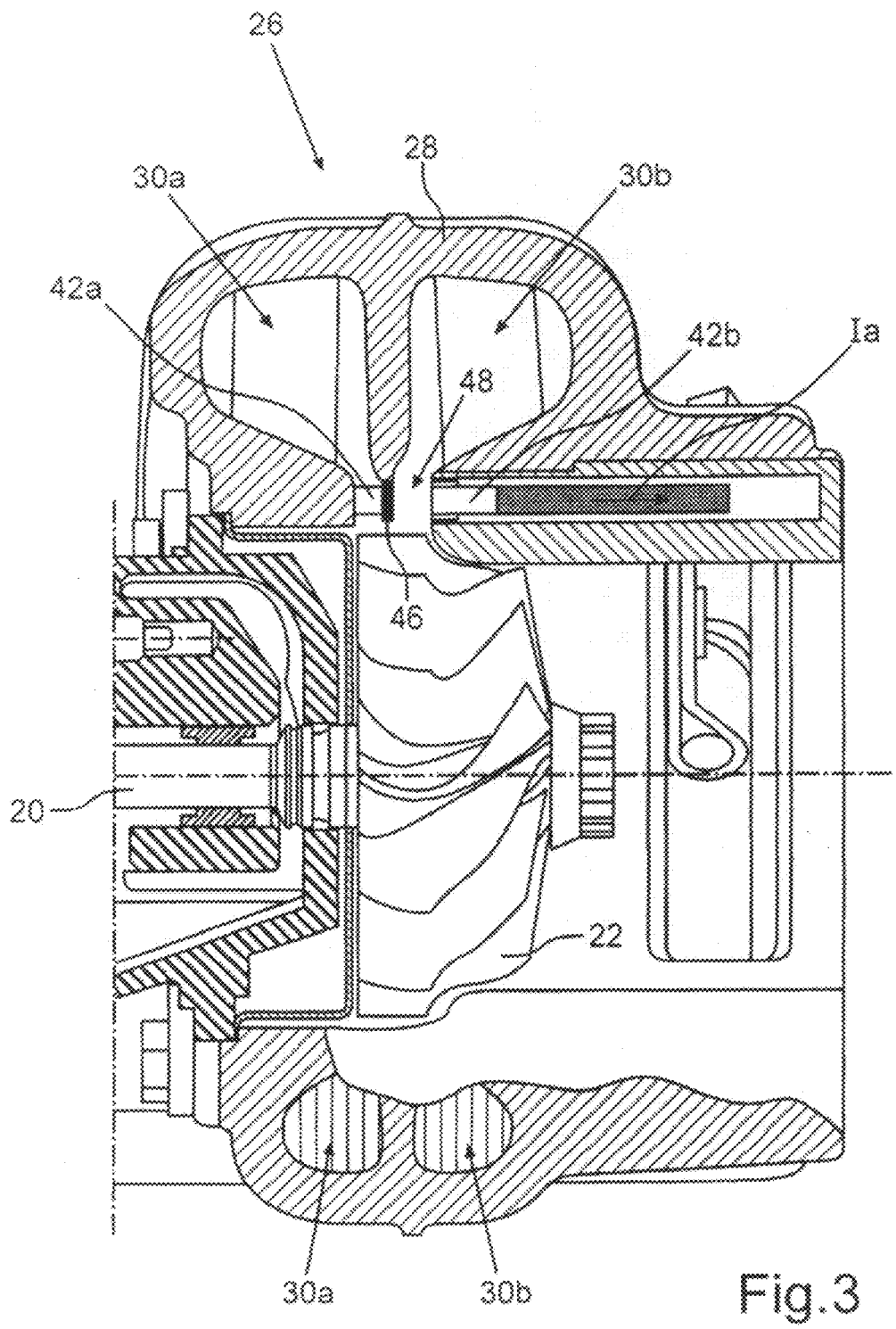
FIG. 3 shows partially in section the exhaust gas guide section of the exhaust gas turbocharger shown in FIG. 2, wherein the second guide vane element is moved into a position in which the flow area of the second spiral channel is fully open.

FIG. 3 shows schematically and partially in section the exhaust gas guide section 26 as shown in FIG. 2, wherein the second guide vane element 42b is retracted so as to open the flow area 48 of the second spiral channel 30b at least to a large extent. This position is particularly advantageous in a high speed range of the internal combustion engine 10. The enlargement of the flow area reduces the entry swirl of the exhaust gas flow which is now determined only by the geometry of the second spiral channel 30b, which is usually configured for a nominal operating point of the internal combustion engine 10. The degree of asymmetry A is reduced to the lower second degree of asymmetry $A_2$, which is now determined via the critical mass flow parameters $\Theta_{42a}$ of the first guide element 42a and the critical mass flow parameter $\Theta_{30b}$ of the second spiral channel 30b according to the formula as:

$$A_2 = \Theta_{42a} / \Theta_{30b}.$$

It has to be emphasized that the second guide vane element 42b can assume basically any arbitrary intermediate position. The flow control device 32 can be used for the fine trimming of the two degrees of asymmetry $A_1$ and $A_2$, which permits a blow-down of exhaust gas from each of the two exhaust gas paths 24a, 24b. The resulting first or second degree of asymmetry $A_{1+AB}$ or $A_{2+AB}$ then adjust as follows according to the respective adjusted flow area cross-section $AB_{24a}$, $AB_{24b}$:

$$A_{1+AB} = \Theta_{42a+AB24}a / \Theta_{42b+AB24}b; \text{ and}$$

$$A_{2+AB} = \Theta_{42a+AB24}a / \Theta_{30b+AB24}b.$$

It can thereby be provided that the flow cross sections $AB_{24a}$ and $AB_{24b}$ are adjusted in the same manner or differently. The most advantageous design ranges of the respective degrees of asymmetry $A_1$ or $A_{1+AB}$ or $A_2$ or $A_{2+AB}$ are chosen in dependence on the exhaust gas recirculation rates and the displacement volume of the internal combustion engine 10 in the following ranges:

$$0.4 < A_{1(+AB)} < 0.8; \text{ and}$$

$$0.25 < A_{2(+AB)} < 0.50.$$

Figure 4:
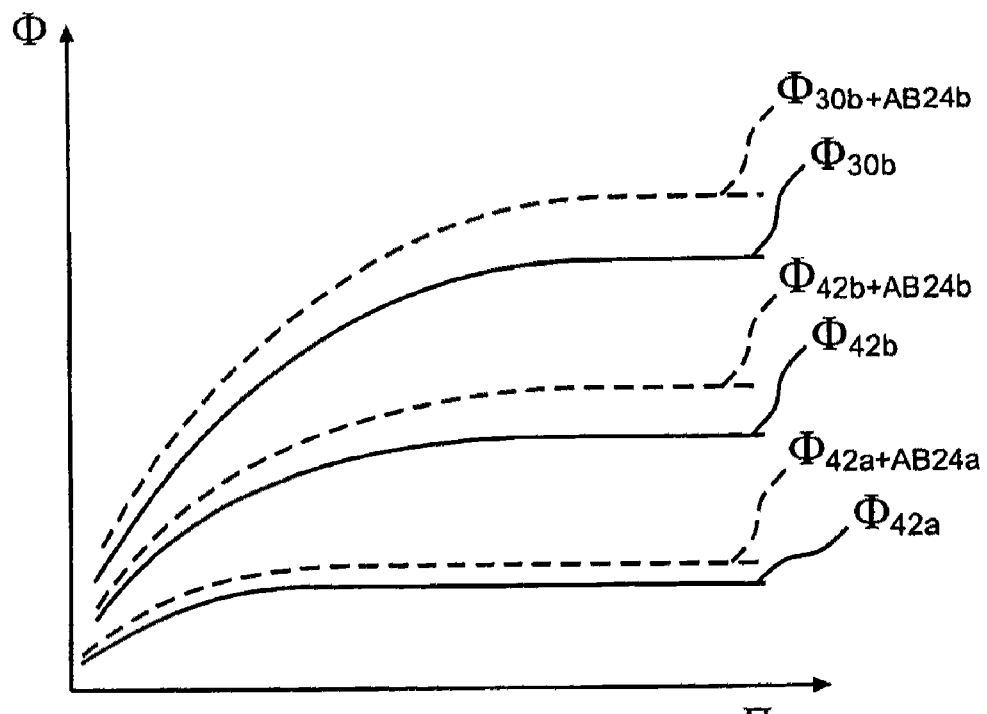
FIG. 4 shows a diagram of different mass flow parameters of the exhaust gas turbocharger in dependence on different pressure ratios in the exhaust gas guide section.

FIG. 4 shows a diagram of different mass flow parameters $\Theta$ of the exhaust gas turbocharger 12 in dependence on different pressure ratios $\pi$ in the exhaust gas guide section 26. Starting at a critical pressure ratio $\pi$, which depends on the exhaust gas path 24a, 24b and on the guide vane element 42a, 42b taking into consideration, respective critical flow-volume parameters $\Theta$ occur, which remain unchanged even with a further increase in pressure, since the sound velocity has been reached in the associated spiral channels 30a or 30b of the exhaust gas guide section 26. The various mass flow parameters $\Theta$ are respectively determined with a full mass flow in the exhaust gas paths 42a, 42b with or without control of the flow control device 32. If the second spiral channel 30b is closed for example and the first spiral channel 30a is kept open, the mass flow parameters $\Theta_{42a}$ or, respectively, $\Theta_{42a+AB24a}$ are obtained. If the first spiral channel 30a is closed, the second spiral channel is kept open and the second guide vane element 42b is moved essentially into a closing position, the mass flow parameters $\Theta_{42b}$ or $\Theta_{42b+AB24}b$ are obtained. If finally the first spiral channel 30a is closed, the second spiral channel 30b is held open and the second guide vane element 42b is moved into the position in which the flow area 48 is open, the mass flow parameters $\Theta_{30b}$ or $\Theta_{30ba+AB24}b$ are established.

Figure 5:
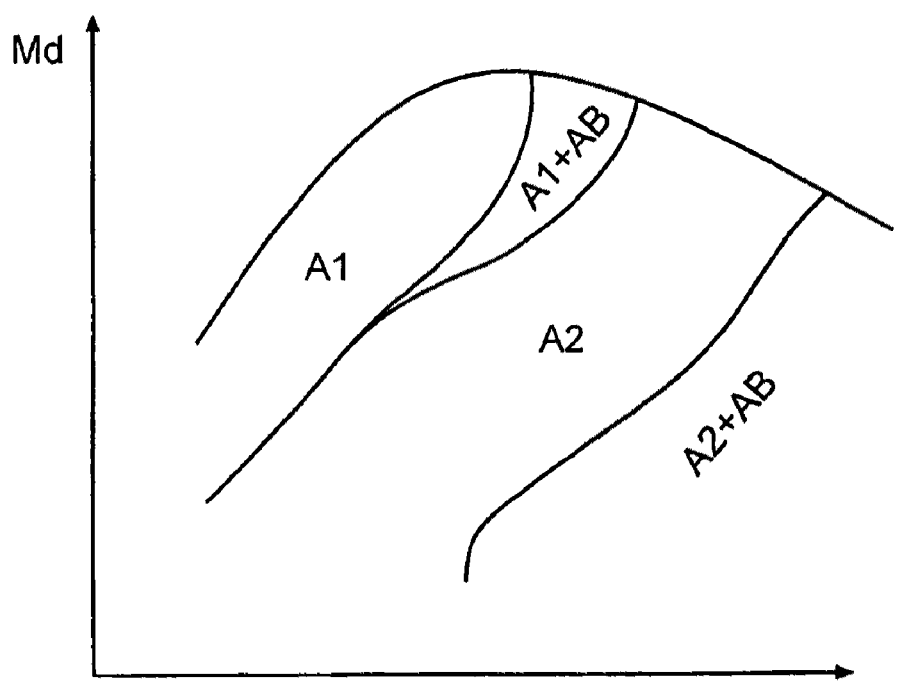
FIG. 5 shows a diagram of an engine characteristic for the internal combustion engine shown in FIG. 1.

FIG. 5 shows a diagram of an engine operating characteristic for the internal combustion engine 10 shown in FIG. 1, wherein the engine torque Md is plotted on the ordinate, and the engine speed n on the abscissa. The variability of the degree of asymmetry A is further indicated in the respective regions. In the region $A_1$, the second guide vane element 42b is in the position in which the flow area 48 is closed at least to a large extent. In the region $A_2$, the second guide vane element 42b is moved into the position in which the flow area 48 is open. As a blow-down of exhaust gas by means of the flow control device 32 may also be reasonable for the emission and consumption optimization in fired operating phases, the corresponding regions $A_{1+AB}$ and $A_{2+AB}$ are obtained, which are located in an upper speed area. In addition to a double path blow-down, which can also generate asymmetrical mass flow parameters because the cross-sectional design of the flow control passages of the flow control device 32 also provides for the flow exchange possibilities between the first and the second exhaust gas path 24a, 24b.

What is claimed is:

1. An internal combustion engine (10) for a motor vehicle, comprising a combustion air inlet tract (16), an at least double path exhaust gas discharge tract (24), an exhaust gas turbocharger (12), which has a compressor wheel (18), arranged in the combustion air inlet tract (16) of the internal combustion engine (10) and a turbine wheel (22) coupled to the compressor wheel (18) in a rotationally fixed manner and being arranged in the double path exhaust gas discharge tract (24) of the internal combustion engine (10), the exhaust gas turbine (22) having a housing (28) with an exhaust gas guide section (26) including at least a first spiral channel (30a) coupled to a first exhaust gas path (24a) of the double path exhaust gas discharge tract (24) through which exhaust gas can be independently conducted, a flow control device (32) arranged upstream of the exhaust gas guide section (26), by means of which the exhaust gas guide section (26) can be bypassed, and first and second guide vane elements (42a, 42b) arranged upstream of the turbine wheel (22) and downstream of first and second spiral channels respectively (30a, 30b) in the exhaust gas guide section (26), the first and the second guide vane elements (42a, 42b) being formed with a first degree of asymmetry ($A_1$), which can be determined as a quotient of a first critical mass flow parameter ($\Theta_{42a}$) and a second critical mass flow parameter ($\Theta_{42b}$) and which has a value between 0.4 and 0.8.

2. The internal combustion engine (10) according claim 1, wherein the first and the second guide vane elements (42a, 42b) can be formed corresponding to a second degree of asymmetry ($A_2$), which can be determined as a quotient of the first critical mass flow parameter ($\Theta_{42a}$) and a third critical mass flow parameter ($\Theta_{30b}$) and which has a value between 0.25 and 0.5.

3. The internal combustion engine (10) according to claim 1, wherein at least one of the first guide vane element (42) and the second guide vane element (42b) is arranged in the exhaust gas flow guide section (26) so as to be movable in a translational or rotational manner for adjusting a flow area (48).

4. The internal combustion engine (10) according to claim 1, wherein at least one of the first guide vane element (42a) and the second guide vane element (42b) is connected to an engine control device (44) of the internal combustion engine (10) to be positioned in dependence on control signals (S), of the engine control device (44).

5. The internal combustion engine (10) according to claim 1, wherein the flow control device (32) is a slide valve for directing the exhaust gas flow between the first exhaust gas path (24a) and the second exhaust gas path (24b).

6. The internal combustion engine (10) according to claim 1, wherein the flow control device (32) is connected to the engine control device (44) of the internal combustion engine (10) for receiving control signals (S) for switching the flow control device (32).

7. The internal combustion engine (10) according to claim 1, wherein an exhaust gas treatment system (34) including at least one of a soot filter, a catalytic converter and a SCR plant is arranged in the double path exhaust gas discharge tract (24) downstream of the flow control device (32).

8. The internal combustion engine (10) according to claim 1, wherein an exhaust gas recirculation system (40) is connected to the double path exhaust gas discharge tract (24) upstream of the flow control device (32) and to the inlet tract (16), by means of which exhaust gas from the exhaust gas tract (24) can be conducted to the inlet tract (16).

9. The internal combustion engine according to claim 8, wherein the exhaust gas recirculation system (40) connected to either one of first and the second exhaust gas path (24a, 24b).

10. The internal combustion engine (10) according to claim 1, wherein a charge-air cooler (38) is arranged in the inlet tract (16) downstream of the compressor (18).

11. The internal combustion engine according to claim 1, wherein the first spiral channel (30a) and the second spiral channel (30b) are formed in an asymmetric manner.

12. The internal combustion engine according to claim 1, wherein the second spiral channel (30b) is configured for a nominal operating point of the internal combustion engine (10).

13. A method for controlling an internal combustion engine (10), for a motor vehicle, including an inlet tract (16) and an exhaust tract (24), an exhaust gas turbocharger (12), with a compressor wheel (18) arranged in the inlet tract (16) and a turbine including a turbine wheel (22) coupled in a rotationally fixed manner to the compressor wheel (18) and arranged in the exhaust tract (24), the turbine having a housing (28) with at least a double passage exhaust gas path (24) formed in an exhaust gas guide section (26) of the housing (28) of the exhaust gas turbine (22) with at least a first spiral channel (30a) coupled to a first exhaust gas path (24a) and a second spiral channel (30b) coupled to a second exhaust gas path (24b) of the exhaust gas tract (24), through which exhaust gas is conducted to first and second spiral channels (30a, 30b); and a flow control device (32) arranged upstream of the exhaust gas guide section (26), by way of which the exhaust gas guide section (26) can be bypassed; a first guide vane element (42a), arranged upstream of the turbine wheel (22) and downstream of the first spiral channel (30a) in the exhaust gas guide section (26), and a second guide vane element (42b), arranged upstream of the turbine wheel (22) and downstream of the second spiral channel (30b) in the exhaust gas guide section (26), said method comprising the steps of:
setting the first and the second guide vane elements (42a, 42b) so as to provide for a first degree of asymmetry ($A_1$), which is determined as a quotient of a first critical mass flow parameter ($\Theta_{42a}$) and a second critical mass flow parameter ($\Theta_{42b}$) wherein the said first and second mass flow parameters have values between 0.4 and 0.8.

14. The method according to claim 13, wherein the first and the second guide vane elements (42a, 42b) are set so as to provide a second degree of asymmetry ($A_2$), which is determined as a quotient of the first critical mass flow parameter ($\Theta_{42a}$) and a third critical mass flow parameter ($\Theta_{30b}$) so that the mass flow parameters have values between 0.25 and 0.5.

15. The method according to claim 13, wherein the second guide vane element (30b) is moved in dependence on an operating state of the internal combustion engine (10) between a position in which the flow area (48) of the second spiral channel (30b) is open at least to a large extent and a position in which the flow area (48) of the second spiral channel (30b) is closed at least to a large extent.

16. The method according to claim 13, wherein, in a lower or medium speed range (n) with a partial load or full load or in an engine braking phase of the internal combustion engine (10) the second guide vane element (42b) is moved into a position closing the flow area (48) of the second spiral channel (30b) at least to a large extent.

17. The method according to claim 13, wherein in an upper speed region (n), the second guide vane element (42b) is moved into the position in which the flow surface (48) of the second spiral channel (30b) is open at least to a large extent.

18. The method according to claim 13, wherein in dependence on the operating state of the internal combustion engine (10), at least a part of the exhaust gas of at least one of the first exhaust gas path (24a) and respectively, the second exhaust gas path (24b) is blown down or directed to the second or, respectively, the first exhaust gas path (24b, 24a).

* * * * *